United States Patent
Kim et al.

(10) Patent No.: US 8,178,172 B2
(45) Date of Patent: May 15, 2012

(54) LIQUID CRYSTAL DISPLAY AND MANUFACTURING METHOD THEREOF

(75) Inventors: Hoon Kim, Ansan-si (KR); Chong-Uk Bang, Daegu (KR); Min-Jae Kim, Suwon-si (KR); Jae-Jin Lyu, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 12/899,363

(22) Filed: Oct. 6, 2010

(65) Prior Publication Data
US 2011/0141416 A1    Jun. 16, 2011

(30) Foreign Application Priority Data
Dec. 14, 2009   (KR) .................. 10-2009-0124220

(51) Int. Cl.
| | | |
|---|---|---|
| *C09K 19/00* | (2006.01) | |
| *C09K 19/06* | (2006.01) | |
| *C09K 19/52* | (2006.01) | |
| *G02F 1/1337* | (2006.01) | |

(52) U.S. Cl. ........ 428/1.1; 428/1.2; 428/1.26; 428/1.27; 428/1.3; 252/299.01; 252/229.4; 430/20; 349/123

(58) Field of Classification Search ............ 428/1.1, 428/1.2, 1.26, 1.27, 1.3; 252/299.01, 299.4; 430/20; 349/123
See application file for complete search history.

(56) References Cited

U.S. PATENT DOCUMENTS
2009/0194737 A1   8/2009   Lai et al.
2011/0149220 A1*  6/2011   Byun et al. .................. 349/123

FOREIGN PATENT DOCUMENTS
| JP | 2006-267823 A | 10/2006 |
|---|---|---|
| JP | 2007-025216 A | 2/2007 |
| JP | 2007-233172 A | 9/2007 |
| JP | 2009-157351 A | 7/2009 |
| JP | 2009-175684 A | 8/2009 |
| JP | 2009-175715 A | 8/2009 |
| KR | 100572985 B1 | 4/2006 |

* cited by examiner

*Primary Examiner* — Geraldina Visconti
(74) *Attorney, Agent, or Firm* — Innovation Counsel LLP

(57) ABSTRACT

A liquid crystal display includes a first display panel and a second display panel facing each other; a liquid crystal layer disposed between the first display panel and the second display panel and including pre-tilted liquid crystal molecules and a first compound derived from a reactive mesogen; and an alignment layer positioned between the first display panel and the second display panel, wherein the alignment layer includes a polyimide derived from a composition including a dianhydride-based compound, and a compound represented by the following Chemical Formula 1.

[Chemical Formula 1]

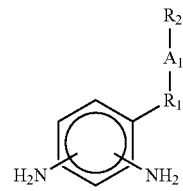

In the above Chemical Formula 1, $R_1$ is a substituted or non-substituted $C_1$-$C_8$ alkyl group, $R_2$ is a substituted or non-substituted $C_8$-$C_{30}$ alkyl group, and $A_1$ is a functional group including a substituted or non-substituted aliphatic ring and a substituted or non-substituted aromatic ring.

21 Claims, 5 Drawing Sheets

LIQUID CRYSTAL DISPLAY AND MANUFACTURING METHOD THEREOF

CROSS-REFERENCE TO RELATED APPLICATION

This application claims priority to and the benefit of Korean Patent Application No. 10-2009-0124220 filed in the Korean Intellectual Property Office on Dec. 14, 2009, the entire contents of which are incorporated herein by reference.

BACKGROUND OF THE INVENTION (a) Field of the Invention

A liquid crystal display and a manufacturing method thereof are provided.

(b) Description of the Related Art

Liquid crystal displays ("LCDs") are now one of the most widely used types of flat panel displays. A liquid crystal display has two display panels on which field generating electrodes, such as pixel electrodes and a common electrode, are formed. A liquid crystal layer is interposed between the two display panels. Voltages are applied to the field generating electrodes on the two display panels so as to generate an electric field across the liquid crystal layer. The electric field then determines the alignment of the liquid crystal molecules in the liquid crystal layer. Accordingly, the polarization of light that is incident into the display is controlled by the alignment of the liquid crystal molecules, thereby causing images to be displayed.

A vertical alignment mode LCD has been developed. In a vertical alignment mode LCD, the major axes of liquid crystal molecules are arranged so as to be perpendicular to the display panel in a state in which an electric field is not applied.

Also, a method for providing a pretilt to the LC molecules in the absence of an electric field has been developed. Providing a pretilt to the LCD molecules improves the response speed of the liquid crystal while achieving a wide viewing angle in a vertical alignment (VA) mode liquid crystal display.

The above information disclosed in this Background section is only for enhancement of understanding of the background of the invention and therefore it may contain information that does not form the prior art that is already known to a person of ordinary skill in the art.

SUMMARY OF THE INVENTION

A liquid crystal display includes: a first display panel and a second display panel facing to each other; a liquid crystal layer interposed between the first display panel and the second display panel; and an alignment layer positioned between the first display panel and the second display panel. The liquid crystal layer includes a first compound, which is derived from a reactive mesogen, and liquid crystal molecules, which are pre-tilted. The alignment layer includes a polyimide derived from a composition including a dianhydride-based compound, and a compound represented by Chemical Formula 1.

[Chemical Formula 1]

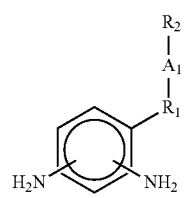

In the above Chemical Formula 1, $R_1$ is a substituted or non-substituted $C_1$-$C_8$ alkyl group, $R_2$ is a substituted or non-substituted $C_8$-$C_{30}$ alkyl group, and $A_1$ is a functional group including a substituted or non-substituted aliphatic ring and a substituted or non-substituted aromatic ring.

The composition may further include a compound represented by Chemical Formula 2.

[Chemical Formula 2]

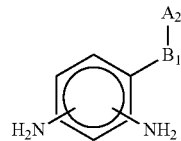

In the above Chemical Formula 2, $B_1$ is an oxygen atom, a carbonyl group, or a carboxylic group, and $A_2$ is a functional group including an aliphatic ring.

In the composition, the ratio of the sum of the number of moles of the compound represented by Chemical Formula 1 and the compound represented by Chemical Formula 2 to the number of moles of the dianhydride-based compound may be more than about ⅓.

The composition may further include a compound represented by Chemical Formula 3.

[Chemical Formula 3]

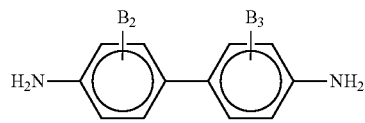

In the above Chemical Formula 3, $B_2$ and $B_3$ are independently OH, O, or COOH.

The compound represented by Chemical Formula 1 may be a compound represented by Chemical Formula 4, a compound represented by Chemical Formula 5, or mixtures thereof.

[Chemical Formula 4]

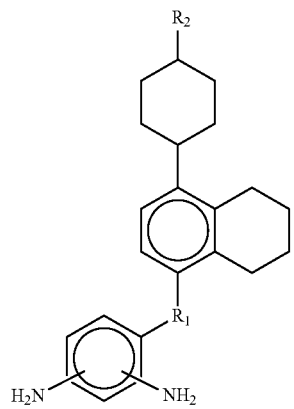

[Chemical Formula 5]

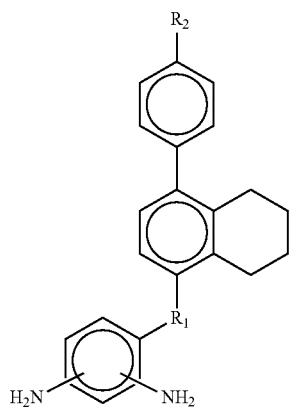

The compound represented by the above Chemical Formula 1 may be a compound represented by Chemical Formula 6, a compound represented by Chemical Formula 7, a compound represented by Chemical Formula 8, a compound represented by Chemical Formula 9, or mixtures thereof.

[Chemical Formula 6]

[Chemical Formula 7]

[Chemical Formula 8]

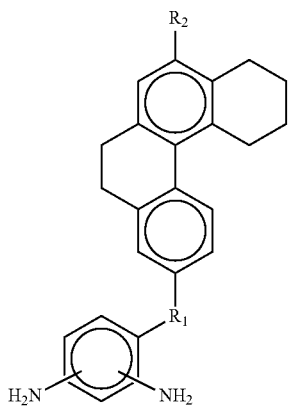

[Chemical Formula 9]

The first compound may be oligomer, a polymer, or a mixture thereof.

The long axis of the first compound may be oriented in a direction that is inclined with respect to the surface of the first display panel, and the liquid crystal molecules may be pre-tilted in the direction that the long axis of the first compound is oriented.

The first display panel may further include a thin film transistor, a color filter, and a pixel electrode, and the second display panel may include a common electrode.

The first display panel may further include a light blocking member.

The pixel electrode may include a minute branch electrode.

The first display panel may further include a first substrate, a gate line disposed on the first substrate, a first data line disposed on the first substrate, and a second data line disposed on the first substrate, the thin film transistor may include a first thin film transistor connected to the gate line and the first data line and a second thin film transistor connected to the gate line and the second data line, and the pixel electrode may include a first sub-pixel electrode connected to the first thin film transistor and a second sub-pixel electrode connected to the second thin film transistor.

A manufacturing method of a liquid crystal display includes: forming an alignment layer at a first display panel; forming a liquid crystal layer including a reactive mesogen and liquid crystal molecules between the first display panel and a second display panel; applying a voltage to the liquid crystal layer; and irradiating the liquid crystal layer with light, wherein the alignment layer is formed from a composition including a dianhydride-based compound, and a compound represented by Chemical Formula 1.

The light may be ultraviolet rays.

A first compound may be synthesized from the reactive mesogen by irradiation of the liquid crystal layer with the light, and the first compound may be an oligomer, a polymer, or a mixture thereof.

The long axis of the first compound may be oriented in a direction that is inclined with respect to the surface of the first display panel, and the liquid crystal molecules may be pre-tilted in the direction the long axis of the first compound is oriented.

According to one aspect, dripping spots of the liquid crystal display may be reduced and the display quality may be improved.

DETAILED DESCRIPTION OF THE EMBODIMENTS

Figure 1:
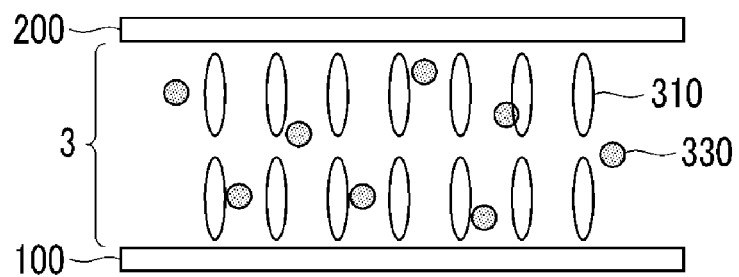
FIG. 1, FIG. 2 and FIG. 3 are views that illustrate a process for pre-tilting liquid crystal molecules.

The present invention will be described more fully hereinafter with reference to the accompanying drawings, in which exemplary embodiments are shown. As those skilled in the art would realize, the described embodiments may be modified in various different ways, all without departing from the spirit or scope of the present invention. In the drawings, irrelevant portions may be omitted for clarity, and like reference numerals designate like elements throughout the specification. Furthermore, detailed descriptions are not provided for methods and/or apparatuses, etc. that are well-known to persons of ordinary skill in the art.

In the drawings, the thickness of layers, films, panels, regions, etc., may be exaggerated for clarity. It will be understood that when an element such as a layer, film, region, or substrate is referred to as being "on" another element, it can be directly on the other element or intervening elements may also be present. In contrast, when an element is referred to as being "directly on" another element, there are no intervening elements present. On the contrary, it will be understood that when an element such as a layer, film, region, or substrate is referred to as being "under" another element, it can be directly under the other element, or intervening elements may also be present. In contrast, when an element is referred to as being "directly under" another element, there are no intervening elements present.

In the present specification, unless it is otherwise specified, the term "substituted" means substituted with at least a substituent selected from the group consisting of a halogen, a C1-C12 haloalkyl group, a C1-C12 alkyl group, a C1-C12 alkoxy group, a C6-C12 aryl group, or a C6-C12 aryloxy group.

A liquid crystal display according to an exemplary embodiment will be described with reference to FIG. 1 to FIG. 3.

Figure 2:
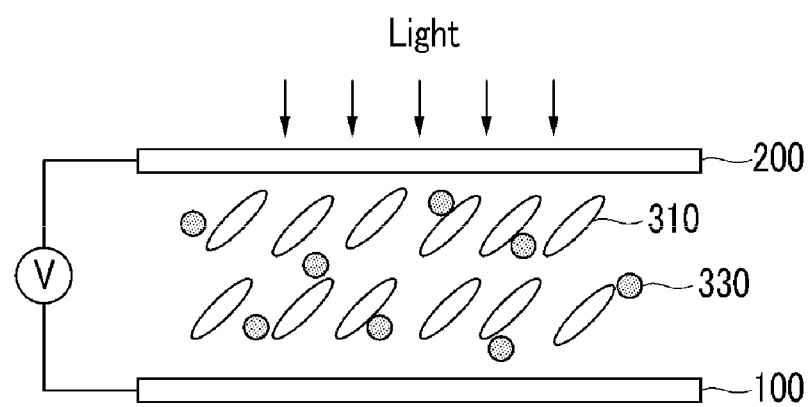
Figure 3:
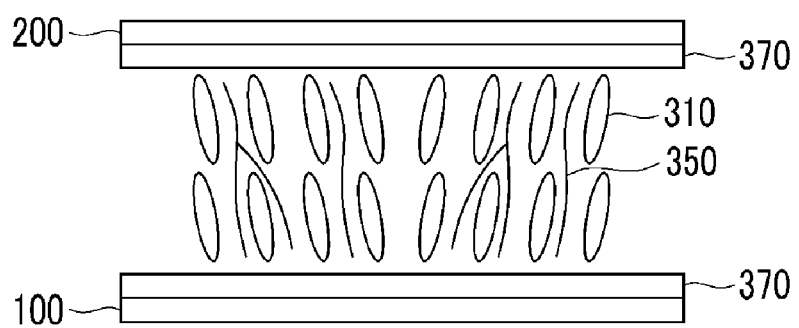

FIG. 1 to FIG. 3 are views that illustrate a process for pre-tilting liquid crystal molecules. A liquid crystal layer that is "pre-tilted" is aligned, without the application of the voltage, at an angle through which the liquid crystal molecules will rotate upon application of the voltage. The pre-tilt angle is typically small. For instance, for a vertically aligned liquid crystal layer that has an angle that is perpendicular (i.e. 90 degrees) to the surfaces of the display panels without application of a voltage. When such a liquid crystal layer is pre-tilted, the angle without application of the voltage may be between 80 and 100 degrees.

Referring to FIG. 1, a liquid crystal layer 3, which is interposed between a first display panel 100 and a second display panel 200, includes reactive mesogens 330 and liquid crystal molecules 310.

The liquid crystal molecules 310 may be aligned in direction perpendicular to the surfaces of the first display panel 100 and the second display panel 200 when a voltage is not applied.

The reactive mesogen 330 includes a reactive functional group and may include an aliphatic ring and an aromatic ring. The reactive functional group is attached at an end of the reactive mesogen 330. The reactive mesogen 330 may be referred to as a polymerizable liquid crystal compound. As shown in FIG. 2 and FIG. 3, when the liquid crystal layer 3 that includes the reactive mesogen 330 also includes additives, such as initiators, and is exposed to light, such as ultraviolet rays, several reactive mesogens 330 may be reacted along with the initiator. Oligomers or polymers of the reactive mesogen 330, or combinations thereof, may be formed through the reaction. The resulting product of the reaction of the reactive mesogens 330 is referred to herein as first compounds 350 and 370. The reactive mesogen 330 may be added to the liquid crystal layer 3 in a relatively small amount as compared with the liquid crystal molecule 310. For example, the reactive mesogen 330 may be added in a range of about 0.1-0.5 wt % of the entire liquid crystal composition.

Referring to FIG. 2, when a voltage is applied to the first display panel 100 and the second display panel 200, the liquid crystal molecules 310 of the liquid crystal layer 3 between the first display panel 100 and the second display panel 200 become arranged in a uniform direction. In a liquid crystal display, the liquid crystal molecules 310 in the liquid crystal display may be arranged in more than one direction, depending, for instance, on the structure of the pixel electrodes and the polarity of the voltages applied to the pixels. For example, the liquid crystal layer 3 of the liquid crystal display having a structure of a first display panel 100 illustrated in FIG. 5, described in more detail below, may include liquid crystal molecules 310 that are arranged in four different directions.

Referring again to FIG. 2, if the light is irradiated, through the second display panel 200, the reactive mesogen 330 may form the first compounds 350 and 370, and the reactive mesogen 330 may cause the liquid crystal molecules 310 to incline (i.e. pre-tilt) even though the voltage is not applied to the first display panel 100 and the second display panel 200. For example, ultraviolet rays may be irradiated with energy of more than about 10 J for about 5 minutes by using a light source which supplies ultraviolet rays that have an irradiation amount of about 35 mW/cm$^2$.

Referring to FIG. 3, the first compounds 350 and 370 may, respectively, be formed between the liquid crystal molecules 310 and at the surface of the first display panel 100 and the second display panel 200. For example, an uppermost layer of the first display panel 100 and/or the second display panel 200 (the layer closest to the liquid crystal layer 3) may be an alignment layer (not shown), and the first compound 370 may be formed at the surface of the alignment layer. When a voltage is not applied to the liquid crystal display, the first compound 350 disposed between the liquid crystal molecules 310 and the first compound 370 disposed on the surface of the display panels 100 and 200 may pre-tilt the liquid crystal molecules 310 along with the alignment layer. For example, the long axis of the first compounds 350 and 370 is at an angle which is inclined with respect to the surface of the first display panel 100, and the liquid crystal molecules 310 are pre-tilted according to the direction of the long axis of the first compounds 350 and 370. Here, the pre-tilt angle of the liquid crystal molecules 310, that is, the angle that the long axis of the liquid crystal molecules forms with the surface of the first display panel 100, may be in the range of, for example, about 80 to 100 degrees. When the liquid crystal molecules 310 are pre-tilted, the response speed of the liquid crystal display may be fast, and thus display quality, for instance for a motion picture, may be improved.

When using the reactive mesogen 330, because response speeds can be increased, patterning of the electrode of the second display panel 200 of the liquid crystal display may not be needed. Therefore, the number of masks used in manufacturing the liquid crystal display may be reduced, thereby reducing the process cost. Also, when the second display panel 200 is not patterned, deterioration of the display device may be avoided even though the first display panel 100 and the second display panel are misaligned. Further, through the use of the reactive mesogen 300 and the pre-tilt, the transmittance of the liquid crystal display when changing from a black gray to an arbitrary gray may be increased by about 20%, dragging of the liquid crystal molecules may be avoided such that the display quality of the motion picture may be improved, and an additional process for preventing static electricity for the polarizer may not be required.

An alignment layer according to an exemplary embodiment may include a polyimide derived from a composition that includes a dianhydride-based compound and a compound represented by the following Chemical Formula 1.

[Chemical Formula 1]

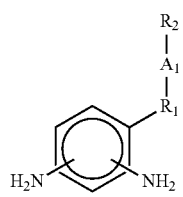

In the above Chemical Formula 1, $R_1$ is a substituted or non-substituted $C_1$-$C_8$ alkyl group, $R_2$ is a substituted or non-substituted $C_8$-$C_{30}$ alkyl group, and $A_1$ is a functional group including a substituted or non-substituted aliphatic ring and a substituted or non-substituted aromatic ring.

The compound represented by the above Chemical Formula 1 may elongate the length of the side chains of the alignment layer, and may improve the vertical alignment property of the alignment layer. If the length of the side chains in the alignment layer is increased, hydrophobicity of the alignment layer may be increased and the surface energy may be decreased. Accordingly, when the reactive mesogen 330 and the liquid crystal molecules 310 are injected into the liquid crystal display, the reactive mesogen 330 may be spread uniformly at the surface of the alignment layer, and drip spots, which may occur when compounds such as the reactive mesogen 330 pool at the surface of the alignment layer, may be reduced.

The compound represented by the above Chemical Formula 1 may further include a compound represented by the following Chemical Formula 4, the compound represented by the following Chemical Formula 5, or mixtures thereof. The below compounds, or mixtures thereof, when included in the liquid crystal layer 3, may help the reactive mesogen 330 to be dispersed uniformly at the surface of the alignment layer.

[Chemical Formula 4]

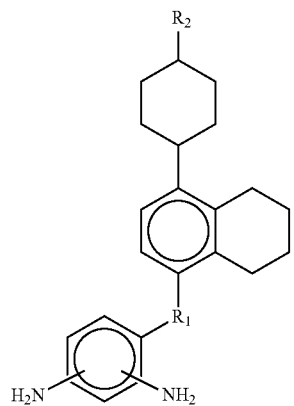

[Chemical Formula 5]

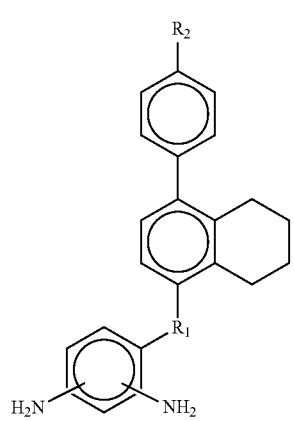

The compound represented by the above Chemical Formula 1 may include a compound represented by the following Chemical Formula 6, a compound represented the following Chemical Formula 7, a compound represented by the following Chemical Formula 8, a compound represented by the following Chemical Formula 9, or mixtures thereof. The below compounds, or mixtures thereof, when included in the liquid crystal layer 3, may help the reactive mesogen 330 to be dispersed uniformly at the surface of the alignment layer.

[Chemical Formula 6]

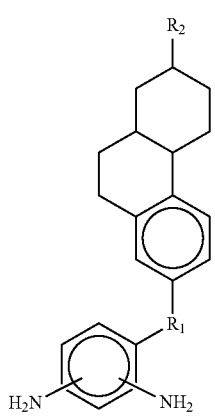

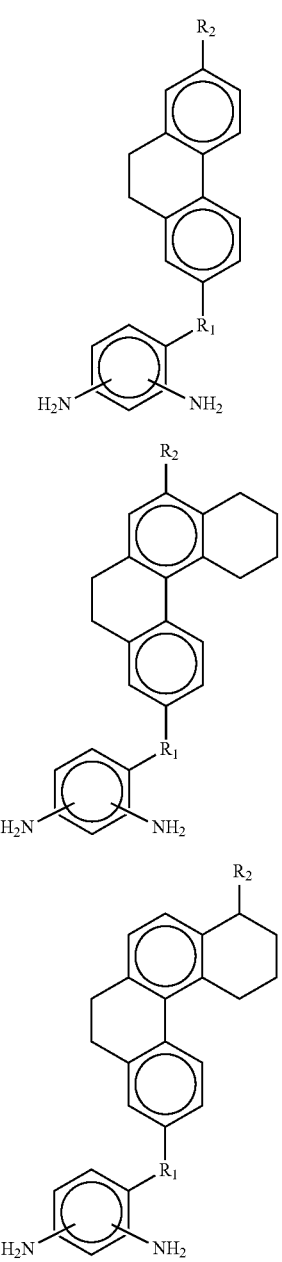

[Chemical Formula 7]

[Chemical Formula 8]

[Chemical Formula 9]

The composition may further include a compound represented by the following Chemical Formula 2. The below compound may enhance the ability of the alignment layer to align vertically.

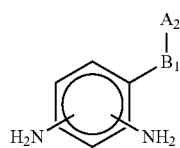

[Chemical Formula 2]

In the above Chemical Formula 2, $B_1$ is an oxygen atom, a carbonyl group, or a carboxylic group, and $A_2$ is a functional group including an aliphatic ring.

The compound represented by Chemical Formula 1, Chemical Formula 2 and the dianhydrate-based compound are included in the liquid crystal layer 3 such that the ratio of the sum of the number of moles of the compound represented by the above Chemical Formula 1 and the compound represented by the above Chemical Formula 2 to the number of moles of the dianhydride-based compound may be more than about ⅓. When the ratio is more than about ⅓, the density of the side chains in the alignment layer may be increased such that the hydrophobicity of the alignment layer may be further increased and the surface energy may be further decreased. Accordingly, when the reactive mesogen 330 and the liquid crystal molecules 310 are injected into the liquid crystal display, the reactive mesogen 330 may be further uniformly dispersed at the surface of the alignment layer, and the potential for drip spots may be further reduced.

The composition may further include a compound represented by the following Chemical Formula 3. The compound represented by Chemical Formula 3 may increase the solubility of the alignment layer.

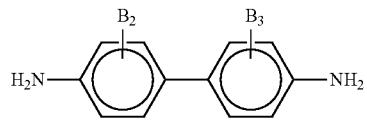

[Chemical Formula 3]

In the above Chemical Formula 3, $B_2$ and $B_3$ are independently OH, O, or COOH.

Next, a liquid crystal display according to another exemplary embodiment will be described with reference to FIG. 4 to FIG. 7. Description already provided with respect to FIG. 1 to FIG. 3 which is redundant is omitted.

Figure 4:
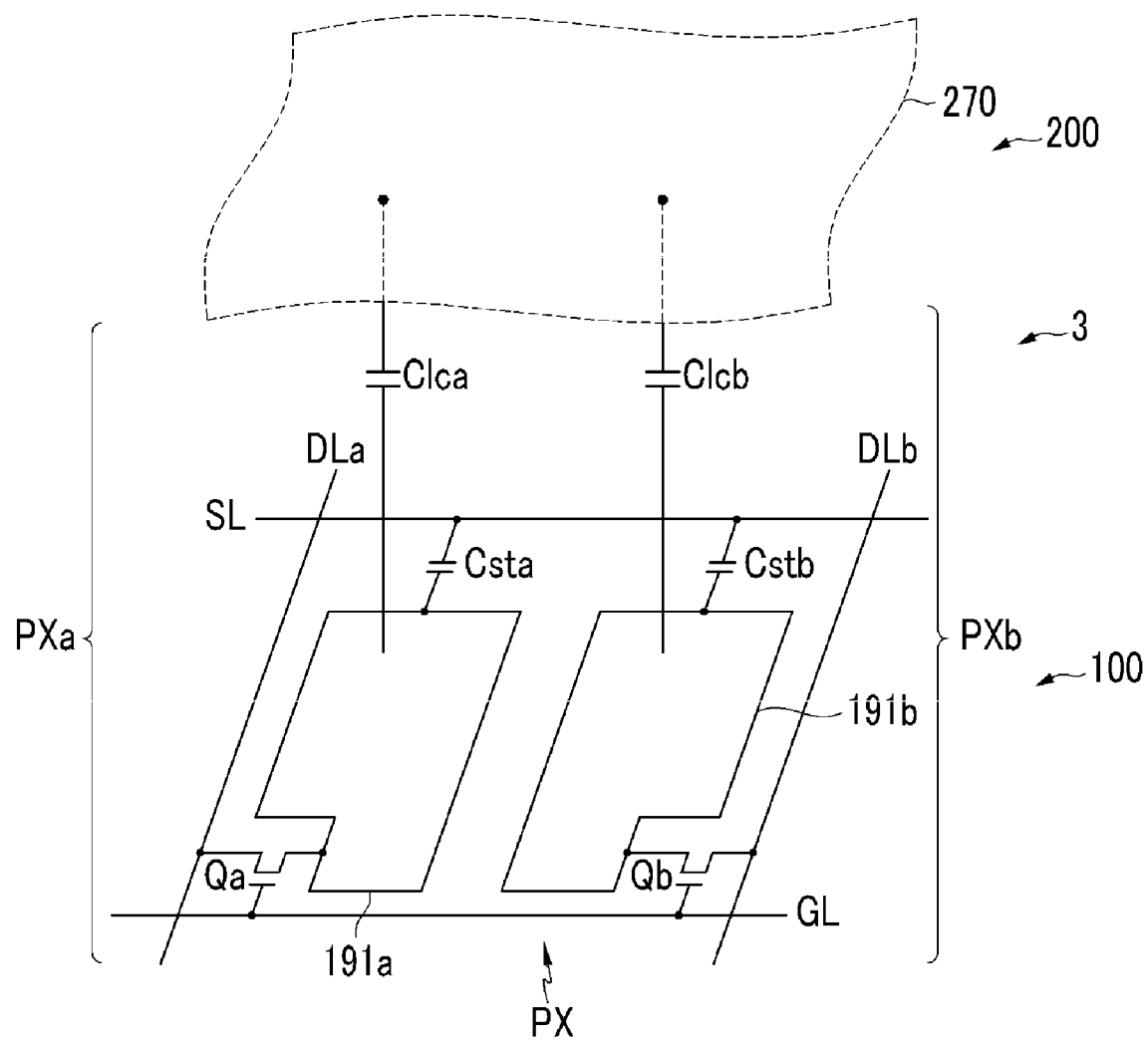
FIG. 4 is an equivalent circuit diagram of a pixel in a liquid crystal display according to an exemplary embodiment.
Figure 5:
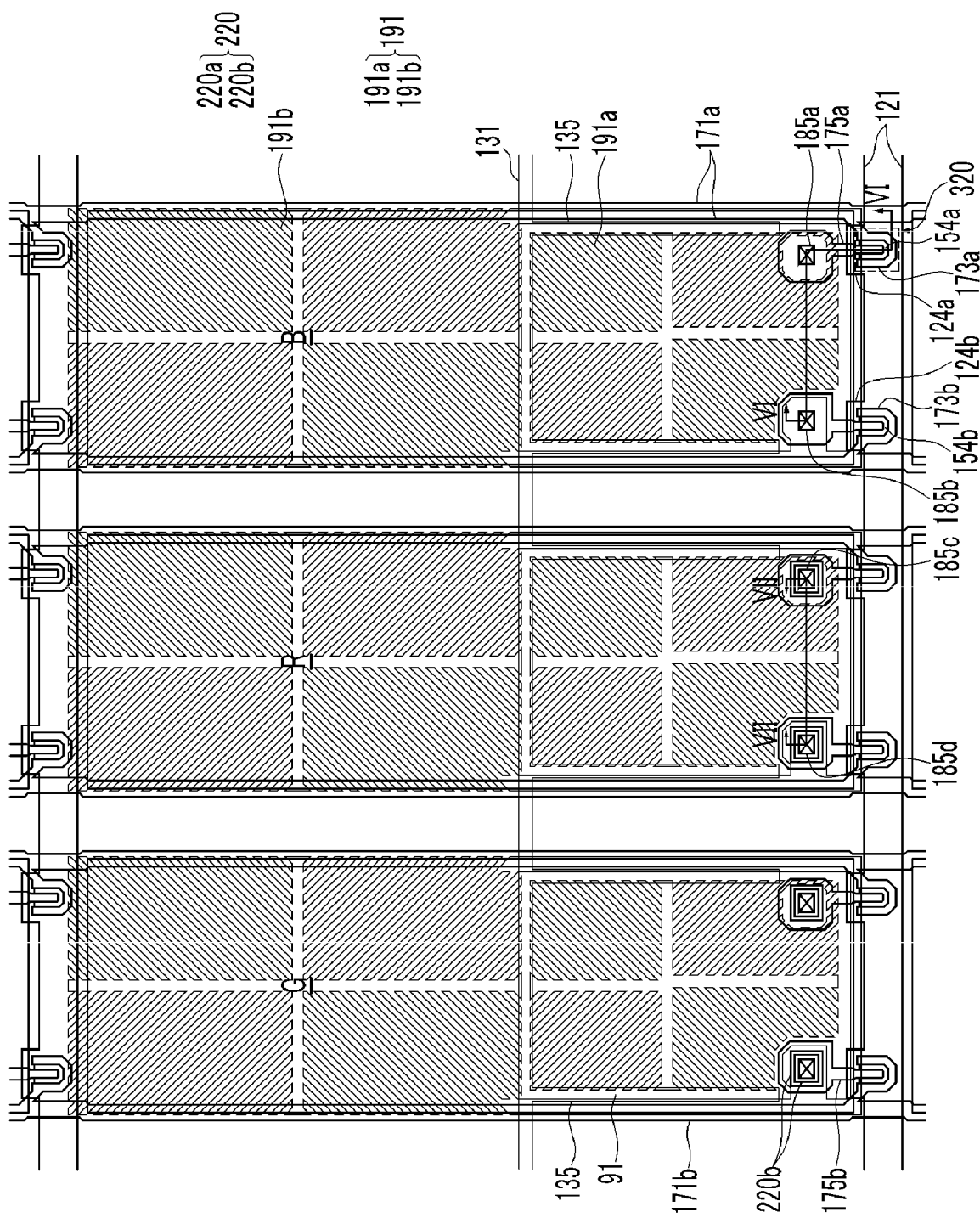
FIG. 5 is a layout view of a liquid crystal display according to an exemplary embodiment.
Figure 6:
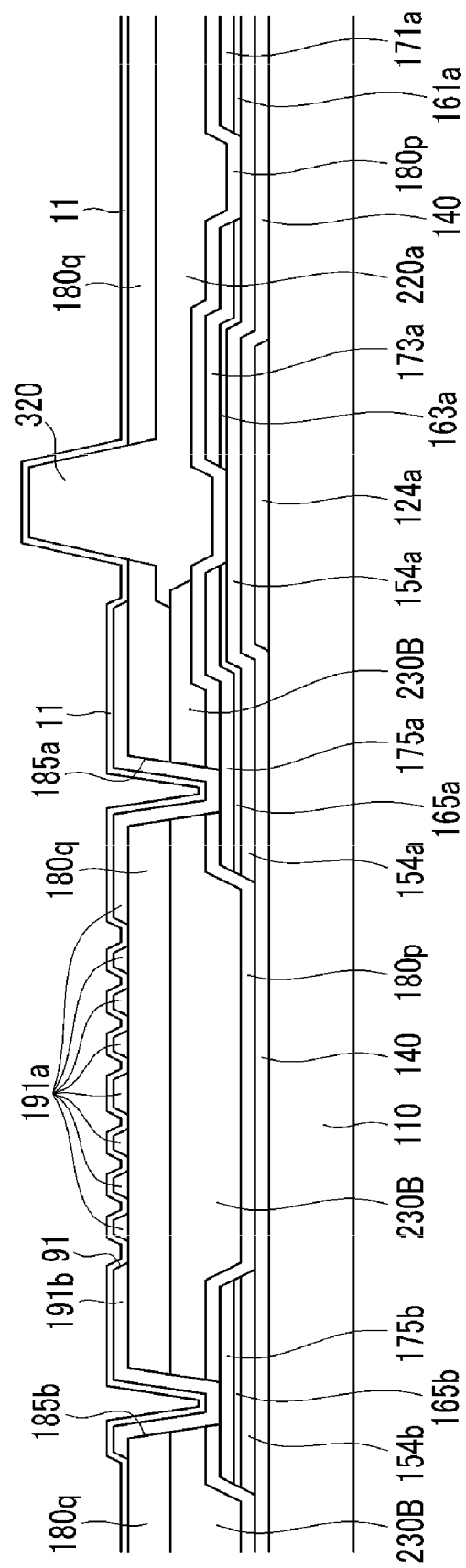
FIG. 6 is a cross-sectional view of the liquid crystal display taken along the line of FIG. 5.
Figure 7:
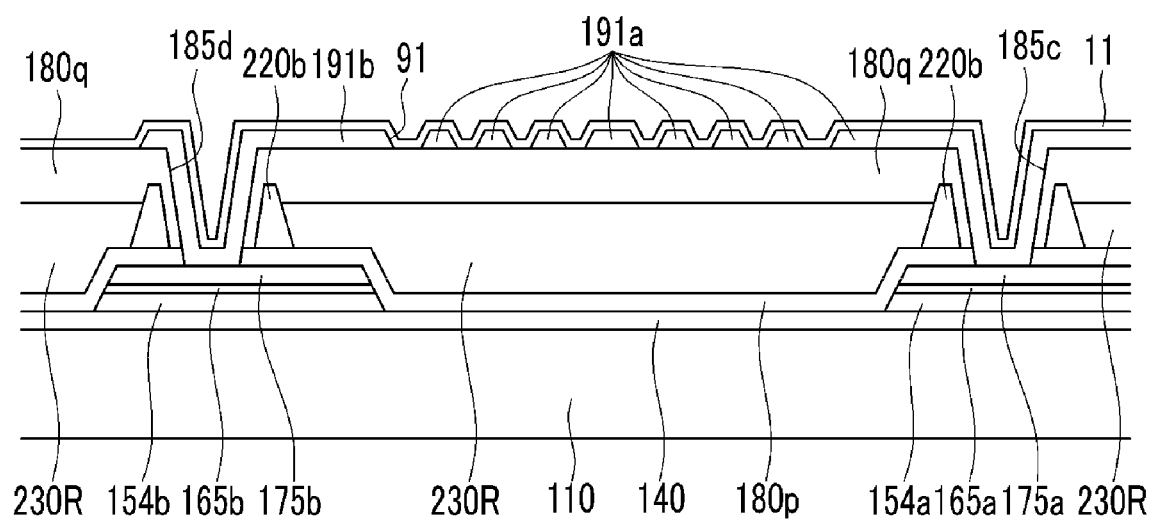
FIG. 7 is a cross-sectional view of the liquid crystal display taken along the line IV-IV of FIG. 5.

FIG. 4 is an equivalent circuit diagram of a pixel in a liquid crystal display according to an exemplary embodiment. FIG. 5 is a layout view of a liquid crystal display according to an exemplary embodiment. FIG. 6 is a cross-sectional view of the liquid crystal display taken along the line of FIG. 5. FIG. 7 is a cross-sectional view of the liquid crystal display taken along the line IV-IV of FIG. 5.

Referring to FIG. 4, a liquid crystal display according to an exemplary embodiment includes a plurality of signal lines DLa, DLb, GL and SL, and pixels PX connected thereto.

Referring to FIG. 4, the liquid crystal display according to the present exemplary embodiment includes first and second display panels 100 and 200 facing each other, and a liquid crystal layer 3 interposed between the two panels 100 and 200. The first display panel 100 includes signal lines that include a plurality of gate lines GL, a plurality of pairs of data lines DLa and DLb, and a plurality of storage electrode lines SL. The first display panel 100 also includes a plurality of pixels PX connected to the signal lines.

Each pixel PX includes a pair of sub-pixels PXa and PXb. Each sub-pixel PXa and PXb includes, respectively, a switching element Qa and Qb, a liquid crystal capacitor Clca and Clcb, and a storage capacitor Csta and Cstb.

Each switching element Qa and Qb is provided on the lower panel 100. Each switching element Qa and Qb is a three terminal element, such as a thin film transistor, and includes a control terminal connected to the gate line GL, an input terminal connected to the data line DLa or DLb, and an output terminal connected to the liquid crystal capacitor Clca or Clcb and the storage capacitor Csta or Cstb.

The liquid crystal capacitors Clca and Clcb use the sub-pixel electrodes 191a and 191b and the common electrode 270 as the two capacitor terminals. The liquid crystal layer 3 between the sub-pixel electrodes 191a and 191b and the common electrode 270 functions as a dielectric material for the capacitors.

The storage capacitors Csta and Cstb serving as assistants to the liquid crystal capacitors Clca and Clcb are formed by the storage electrode line SL provided on the panel 100 and sub-pixel electrode 191a and 191b that overlap the storage electrode line SL, with an insulator interposed therebetween. A predetermined voltage, such as the common voltage Vcom, is applied to the storage capacitors Csta and Cstb.

Referring to FIG. 5 to FIG. 7, a plurality of gate lines 121 and a plurality of storage electrode lines 131 and 135 are formed on an insulating substrate 110 that is made of glass or plastic. Each gate line 121 transmits a gate signal and extends substantially in a row, or lateral, direction. Each gate line 121 includes a plurality of first and second gate electrodes 124a and 124b that protrude upward from the gate line.

The storage electrode lines include a stem 131 extending substantially parallel to the gate lines 121, and a plurality of storage electrodes 135 that extend from the stem 131. The arrangement and the shape of the storage electrode lines 131 and the storage electrodes 135 may be variously changed. The storage electrode lines 131 and the storage electrodes 135 may also be omitted.

A gate insulating layer 140 is formed on the gate lines 121, the storage electrode lines 131 and the storage electrodes 135. The gate insulating layer 140 may include, for example, silicon nitride (SiNx) or silicon oxide (SiOx).

A plurality of semiconductors 154a and 154b, which are typically made of hydrogenated amorphous silicon (amorphous silicon is referred to as a-Si) or polysilicon, are formed on the gate insulating layer 140.

A plurality of pairs of ohmic contacts 161a, 161b, 163a, 163b, 165a, and 165b are formed on the semiconductors 154a and 154b, and the ohmic contacts 161a, 163a, 165a, and 165b may be formed of a material such as n+ hydrogenated amorphous silicon, in which amorphous silicon is doped with a high concentration of an n-type impurity, or of a metal silicide.

A plurality of a pairs of data lines 171a and 171b and a plurality of first and second drain electrodes 175a and 175b are formed on the ohmic contacts 161a, 163a, 165a, and 165b, and on the gate insulating layer 140. Also, a storage voltage supplying line (not shown) is formed in a peripheral area with the same layer as the data lines 171a and 171b are formed. The storage voltage supplying line is formed substantially in the column direction, and is electrically connected to the plurality of storage electrode lines 131.

The data lines 171a and 171b transmit data signals, and extend substantially in the column, or longitudinal, direction thereby intersecting the gate lines 121 and the stems 131 of the storage electrode lines. Each data line 171a and 171b includes a plurality of first and second source electrodes 173a and 173b that extend toward the first and second gate electrodes 124a and 124b and are curved with a "U" shape. The first and second source electrodes 173a and 173b are opposite to the first and second drain electrodes 175a and 175b with respect to the first and second gate electrodes 124a and 124b.

The first and second gate electrode 124a and 124b, first and second source electrode 173a and 173b, and first and second drain electrode 175a and 175b respectively form the first and second thin film transistor (TFT) Qa and Qb along with the first and second semiconductor 154a and 154b. The channel of the thin film transistors Qa and Qb is formed in the first and second semiconductors 154a and 154b between the first and second source electrodes 173a and 173b and the first and second drain electrodes 175a and 175b. The first and second drain electrodes 175a and 175b are respectively connected to sub-pixel electrodes 191a and 191b of the liquid crystal display, thereby applying the driving voltage to the sub-pixel electrodes 191a and 191b.

The ohmic contacts 163b and 165b are interposed only between the underlying semiconductor islands 154a and 154b, and the overlying data lines 171a and 171b and drain electrodes 175a and 175b, thereby reducing the contact resistance between the underlying semiconductors 154a and 154b and the overlying data lines 171a and 171b and drain electrodes 175a and 175b.

Three layers, which include the first and second semiconductors 154a and 154b except for the channel portion, the ohmic contacts 161a, 161b, 163a, 163b, 165a, and 165b, and the data lines 171a and 171b including the first and second source electrodes 173a and 173b and the first and second drain electrodes 175a and 175b, have substantially the same plane shape. The three layers may be formed by using one mask. However, the first and second semiconductors 154a and 154b and the ohmic contacts 161a, 161b, 163a, 163b, 165a, and 165b may have an island shape. Also, the shape of the three layers may be variously changed.

A lower layer 180p that is made from, for example, silicon nitride or silicon oxide, is formed on the data lines 171a and 171b, the drain electrodes 175a and 175b, and the exposed semiconductors 154a and 154b.

A blue color filter 230B, a green color filter 230G, and a red color filter 230R are formed on the lower layer 180p. Each of color filters 230B, 230G, and 230R, and the green color filter, may have an elongated rectangular shape in a plan view. Also, each of the color filters 230B, 230G, and 230R and the green color filter are typically printed by an Inkjet process, such that the process property is good.

An upper layer 180q is formed on the color filters 230B, 230G, and 230R. The upper layer 180q may include, for example, silicon oxide, silicon nitride, or a photosensitive organic material. The upper layer 180q has the function of planarizing the thin film transistor array panel.

Light blocking members 220a and 220b are formed between the lower layer 180p and the upper layer 180q. The light blocking members 220a and 220b extend substantially in the column direction parallel to the data line 171a and 171b and include a protrusion 220b that covers the first and second thin film transistors Qa and Qb. The light blocking member 220a covers the color filters 230B, 230G, and 230R, thereby preventing light leakage.

A spacer 320 made from the same layer as the light blocking member 220 is formed between the lower layer 180p and the upper layer 180q. However, the spacer 320 may be formed with a different layer from the layer used to form the light blocking member 220. The spacer 320 has the function of maintaining a gap for the liquid crystal layer 3, and may be, for example, a column spacer 320. The column spacer 320 may be disposed between the first and second thin film transistors Qa and Qb.

The light blocking member 220 and the column spacer 320 may include the same material, and may be formed with different thicknesses by using a half-tone mask. Also, the arrangement and the shape of the column spacer 320 may be variously changed.

A plurality of pixel electrodes 191 and a connecting member (not shown) are formed on the upper layer 180q. The plurality of pixel electrodes 191 and the connecting member 82 may include the same material, such as ITO or IZO, and may be formed in the same process.

Each pixel electrode 191 includes the first and second sub-pixel electrodes 191a and 191b that are separated from each other by a gap 91 therebetween.

The overall shape of the first and second sub-pixel electrodes 191a and 191b is a quadrangle. The area occupied by the second sub-pixel electrode 191b may be larger than the area occupied by the first sub-pixel electrode 191a in the whole pixel electrode 191. The first and second sub-pixel electrodes 191a and 191b each include a main branch and a sub-branch. The main branch has portions substantially parallel to the gate line 121 and sections substantially parallel to the data line 171. The sub-branch is a minute (i.e. very small) branch that has a comb-tooth shape.

Each first and second sub-pixel electrode 191a and 191b is physically and electrically connected to the first and second drain electrodes 175a and 175b, respectively, through contact holes 185a and 185b or 185c and 185d. Each first and second sub-pixel electrode 191a and 191b receives data voltages from, respectively, the first and second drain electrode 175a and 175b.

A lower alignment layer 11 is formed on the plurality of pixel electrodes 191 and the connecting member 82. The lower alignment layer 11 may be the above-described alignment layer.

The second display panel 200 includes the common electrode 270 (FIG. 4) that is not patterned.

A liquid crystal layer 3 (FIG. 4) including the above-described reactive mesogen and the liquid crystal molecules is formed between the first display panel 100 and the second display panel 200.

Next, a manufacturing method of a liquid crystal display according to another exemplary embodiment will be described. Redundant description with respect to FIG. 1 to FIG. 3 is omitted.

The alignment layer is formed on the first display panel 100. The alignment layer 11 may be the above-described alignment layer. When using the above-described alignment layer, the reactive mesogen 330 in the liquid crystal layer 3 may be spread uniformly at the surface of the alignment layer, and drip spotting on the surface of the alignment layer may be reduced.

The liquid crystal layer 3 including the reactive mesogen 330 and the liquid crystal molecules 310 is placed between the first display panel 100 and the second display panel 200.

A voltage is applied to the liquid crystal layer 3. Also, liquid crystal layer 3 is irradiated with light, such as ultraviolet rays. The application of the voltage and the irradiation with light may be executed simultaneously. The liquid crystal molecules 310 are rotated by the voltage application such that they may be inclined with respect to the surface of the first display panel 100. The first compounds 350 and 370 may be synthesized from the reactive mesogen 330 as described above.

After formation of the first compounds 350 and 370, the first compounds 350 and 370 affect the orientation of the liquid crystal molecules, such that even when voltage is not applied to the liquid crystal layer 3, the liquid crystal molecules 310 may be pre-tilted with respect to the surface of the first display panel 100 or the second display panel 200 in a direction in which the long axis of the first compounds 350 and 370 is oriented. Here, the direction that the long axis of the first compounds 350 and 370 is oriented may be the inclined direction with respect to the surface of the first display panel 100 or the second display panel 200.

Next, examples are described, however the below examples are for purposes of illustration of the embodiments, and the present invention is not limited thereto.

Example 1

An alignment layer is formed on the display panels of a liquid crystal display by using a composition that includes a dianhydride-based compound represented by the following Chemical Formula 10 at 20 mol %, a compound represented by the following Chemical Formula 11 at 6 mol %, a compound represented by the following Chemical Formula 12 at 2 mol %, and a compound represented by the following Chemical Formula 13 at 12 mol %. The liquid crystal display, which includes liquid crystal molecules and the reactive mesogen in the liquid crystal layer, is manufactured as described above.

[Chemical Formula 10]

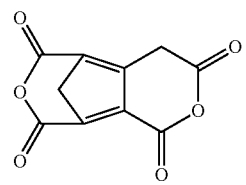

[Chemical Formula 11]

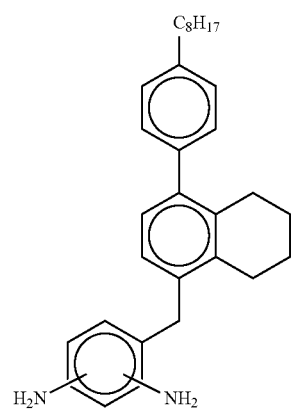

[Chemical Formula 12]

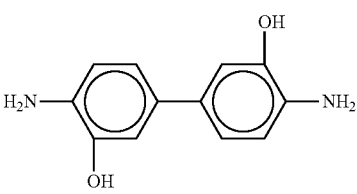

[Chemical Formula 13]

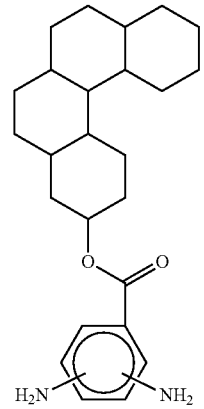

Comparative Example 1

A liquid crystal display is manufactured with the same method as the above Example 1, except that the alignment layer is formed by using a composition that includes the dianhydride-based compound represented by the above Chemical Formula 10 at 20 mol %, a compound represented by the following Chemical Formula 14 at 2 mol %, a compound represented by the following Chemical Formula 15 at 14 mol %, and a compound represented by the following Chemical Formula 16 at 4 mol %.

[Chemical Formula 14]

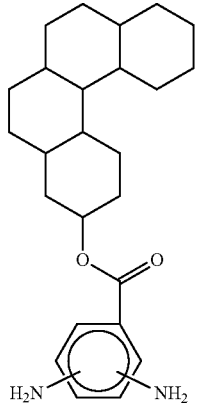

[Chemical Formula 15]

[Chemical Formula 16]

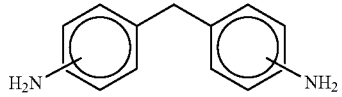

Measuring Drip Spots

The drip spots were measured and are represented in Table 1 below for the liquid crystal displays of Example 1 and Comparative Example 1.

TABLE 1

|  | Degree of drip spots | | | Extinction of drip spots |
| --- | --- | --- | --- | --- |
|  | 32 gray | 16 gray | 8 gray |  |
| Example 1 | very small | small | medium | 33 gray |
| Comparative Example 1 | Not recognized | very small | small | 17 gray |

In Example 1, the degree of dripping spots is smaller than in Comparative Example 1. Generally, the dripping spots may be easily recognized as the value of the gray is deceased.

Measuring Spots of an Alignment Layer

Spots of the alignment layer were measured for the liquid crystal displays manufactured in Example 1 and Comparative Example 1.

When the alignment layer of the liquid crystal display is formed through Example 1, the spots of the alignment layer are not generated. In the liquid crystal display of Comparative Example 1, spots of the alignment layer are generated with an oblique line shape. Accordingly, it may be confirmed that the process characteristic for the alignment layer of Example 1 is good.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
   a first display panel and a second display panel facing each other;
   a liquid crystal layer disposed between the first display panel and the second display panel, the liquid crystal layer comprising a first compound and liquid crystal molecules; and
   an alignment layer disposed between the first display panel and the second display panel,
   wherein the liquid crystal molecules are pre-tilted,
   wherein the first compound is derived from a reactive mesogen, and
   wherein the alignment layer comprises a polyimide derived from a composition comprising:
   a dianhydride-based compound, and
   a compound represented by Chemical Formula 1:

[Chemical Formula 1]

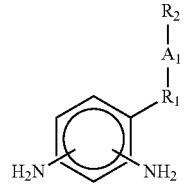

wherein $R_1$ is a substituted or non-substituted $C_1$-$C_8$ alkyl group, $R_2$ is a substituted or non-substituted $C_8$-$C_{30}$ alkyl group, and $A_1$ is a functional group comprising a substituted or non-substituted aliphatic ring and a substituted or non-substituted aromatic ring.

2. The liquid crystal display of claim 1, wherein the composition further comprises a compound represented by Chemical Formula 2:

[Chemical Formula 2]

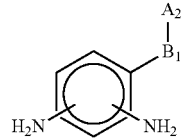

wherein $B_1$ is an oxygen atom, a carbonyl group, or a carboxylic group, and $A_2$ is a functional group comprising an aliphatic ring.

3. The liquid crystal display of claim 2, wherein a ratio of a sum of a number of moles of the compound represented by Chemical Formula 1 and the compound represented Chemical Formula 2 to a number of moles of the dianhydride-based compound is more than about ⅓.

4. The liquid crystal display of claim 2, wherein the composition further comprises a compound represented by Chemical Formula 3:

[Chemical Formula 3]

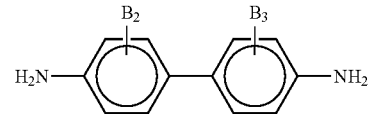

wherein $B_2$ and $B_3$ are independently OH, O, or COOH.

5. The liquid crystal display of claim 1, wherein
the compound represented by Chemical Formula 1 includes a compound represented by the following Chemical Formula 4, a compound represented by the following Chemical Formula 5, or mixtures thereof:

[Chemical Formula 4]

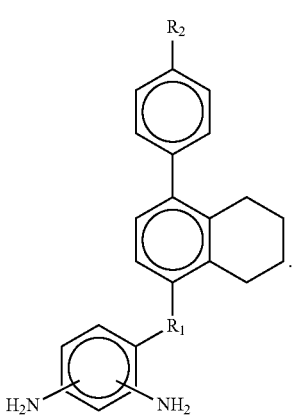

[Chemical Formula 5]

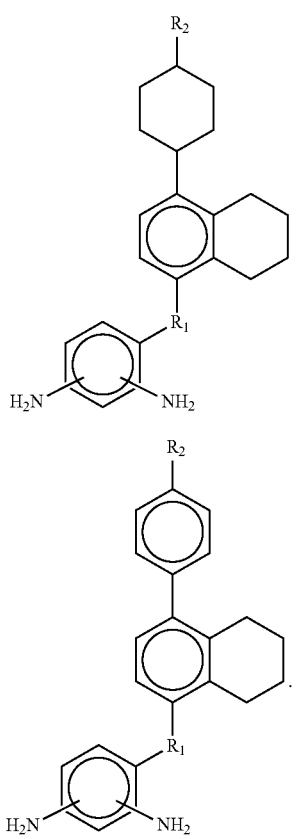

6. The liquid crystal display of claim 1, wherein
the compound represented by Chemical Formula 1 includes a compound represented by Chemical Formula 6, a compound represented by Chemical Formula 7, a compound represented by Chemical Formula 8, a compound represented by Chemical Formula 9, or mixtures thereof:

[Chemical Formula 6]

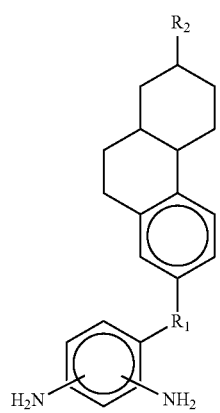

[Chemical Formula 7]

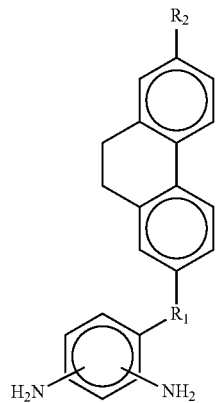

[Chemical Formula 8]

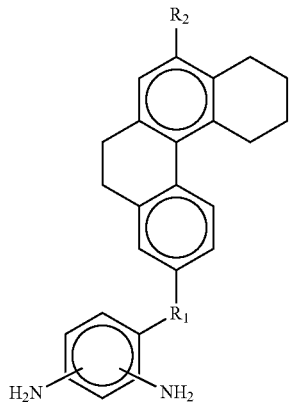

[Chemical Formula 9]

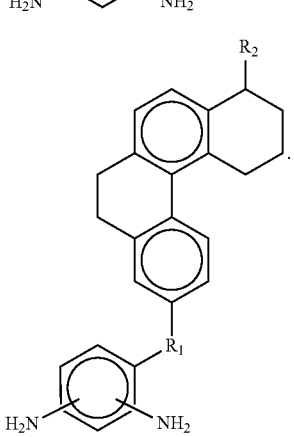

7. The liquid crystal display of claim 1, wherein
the first compound is an oligomer, a polymer, or a mixture thereof.

8. The liquid crystal display of claim 7, wherein
a long axis of the first compound is oriented in a direction that is inclined with respect to a surface of the first display panel facing the second display panel, and the liquid crystal molecules are pre-tilted according to the orientation of the long axis of the first compound.

9. The liquid crystal display of claim 1, wherein
the first display panel further comprises a thin film transistor, a color filter, and a pixel electrode, and the second display panel comprises a common electrode.

10. The liquid crystal display of claim 9, wherein
the first display panel further comprises a light blocking member.

11. The liquid crystal display of claim 10, wherein
the pixel electrode comprises a minute branch electrode.

12. The liquid crystal display of claim 10, wherein:
the first display panel further comprises a first substrate, a gate line disposed on the first substrate, a first data line disposed on the first substrate, and a second data line disposed on the first substrate;
the thin film transistor comprises a first thin film transistor connected to the gate line and the first data line and a second thin film transistor connected to the gate line and the second data line; and
the pixel electrode comprises a first sub-pixel electrode connected to the first thin film transistor and a second sub-pixel electrode connected to the second thin film transistor.

13. A method for manufacturing a liquid crystal display comprising:
forming an alignment layer at a first display panel;
forming a liquid crystal layer comprising a reactive mesogen and liquid crystal molecules between the first display panel and a second display panel;
applying a voltage to the liquid crystal layer; and
irradiating the liquid crystal layer with light,
wherein the alignment layer is formed of a composition comprising:
a dianhydride-based compound, and
a compound represented by Chemical Formula 1:

[Chemical Formula 1]

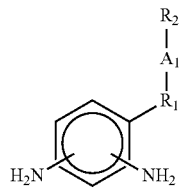

wherein $R_1$ is a substituted or non-substituted $C_1$-$C_8$ alkyl group, $R_2$ is a substituted or non-substituted $C_8$-$C_{30}$ alkyl group, and $A_1$ is a functional group comprising a substituted or non-substituted aliphatic ring and a substituted or non-substituted aromatic ring.

14. The method of claim 13, wherein
the composition further comprises a compound represented by Chemical Formula 2:

[Chemical Formula 2]

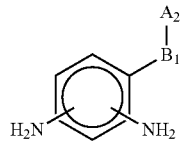

wherein $B_1$ is an oxygen atom, a carbonyl group, or a carboxylic group, and $A_2$ is a functional group comprising an aliphatic ring.

15. The method of claim 14, wherein
a ratio of the sum of a number of moles of the compound represented by Chemical Formula 1 and the compound represented by Chemical Formula 2 to a number of moles of the dianhydride-based compound is more than about ⅓.

16. The method of claim 14, wherein
the composition further comprises a compound represented by Chemical Formula 3:

[Chemical Formula 3]

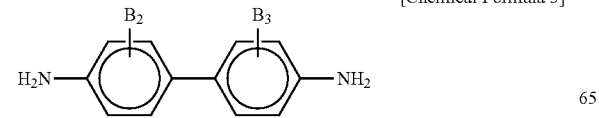

wherein $B_2$ and $B_3$ are independently OH, O, or COOH.

17. The method of claim 13, wherein
the compound represented by the above Chemical Formula 1 includes a compound represented by the following Chemical Formula 4, a compound represented by the following Chemical Formula 5, or a mixture thereof:

[Chemical Formula 4]

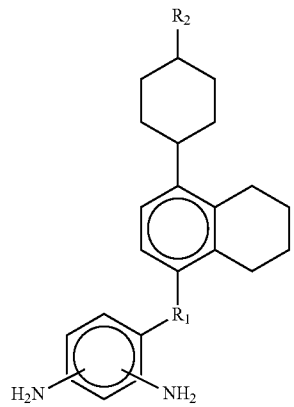

[Chemical Formula 5]

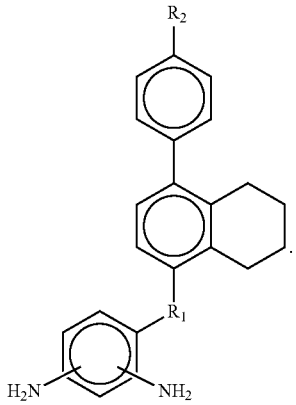

18. The method of claim 13, wherein
the compound represented Chemical Formula 1 includes a compound represented by the following Chemical Formula 6, a compound represented by the following Chemical Formula 7, a compound represented by the following Chemical Formula 8, a compound represented by the following Chemical Formula 9, or mixtures thereof:

[Chemical Formula 6]

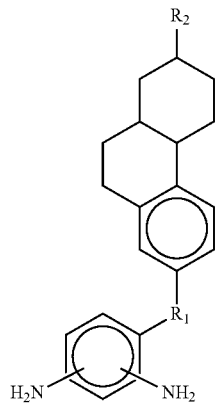

[Chemical Formula 7]

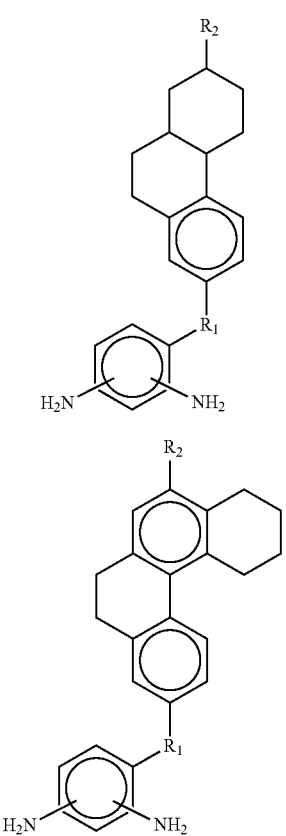

[Chemical Formula 8]

[Chemical Formula 9]

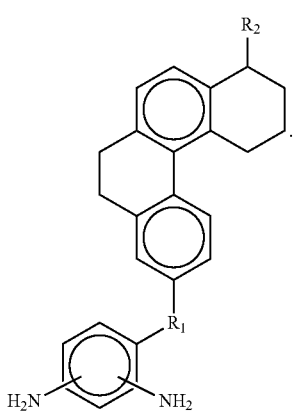

19. The method of claim 13, wherein the light is ultraviolet rays.

20. The method of claim 13, wherein a first compound is synthesized from the reactive mesogen by the irradiation of the light, and the first compound is an oligomer, a polymer, or a mixture thereof.

21. The method of claim 20, wherein a direction that a long axis of the first compound is oriented is a direction that is inclined with respect to a surface of the first display panel facing the second display panel, and the liquid crystal molecules are pre-tilted according to the direction that the long axis of the first compound is oriented.

\* \* \* \* \*